Dec. 20, 1960    C. F. PARROTT    2,965,309
MIXING APPARATUS
Filed Sept. 1, 1959
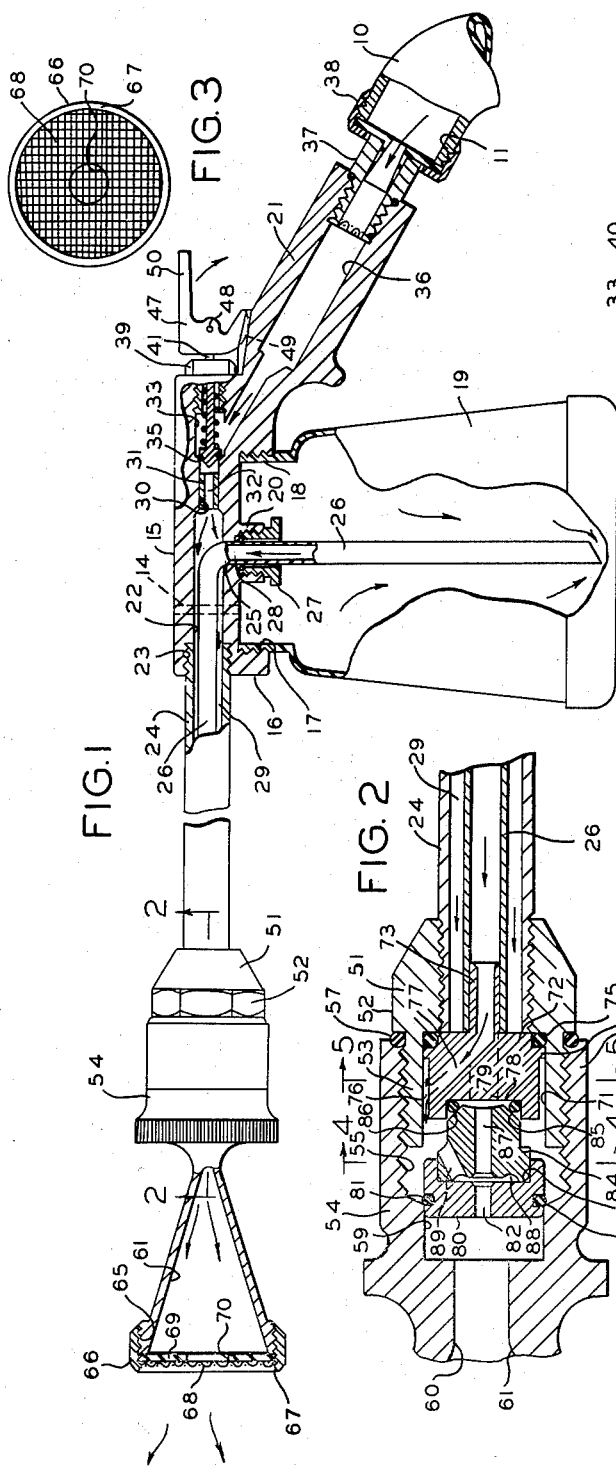
INVENTOR.
CLARENCE F. PARROTT
BY
ATTORNEY

United States Patent Office 2,965,309
Patented Dec. 20, 1960

2,965,309

MIXING APPARATUS

Clarence F. Parrott, % Parco Products Co., Pottstown Ave. and Dotts St., Pennsburg, Pa.

Filed Sept. 1, 1959, Ser. No. 837,376

4 Claims. (Cl. 239—310)

This invention relates to mixing sprayers and more particularly to a mixing sprayer for attachment to a source of water under pressure, such as that available with a garden hose, for mixing therewith and dispensing another material, such as an insecticide, weed killer, plant food, or other desired material.

The mixing sprayers heretofore available had numerous disadvantageous characteristics.

Certain types heretofore available permitted leakage back of the material to be dispensed, particularly with a surge at shut-off so that if of a poisonous nature the material might contaminate the water supply or remain in the system after the dispensing apparatus was detached.

In other types of apparatus heretofore available, the outlet of the spray was too close to the hand or to the body of the user so that the material being delivered came into contact with the user. This was particularly objectionable where the material being dispensed was of a poisonous nature.

In other types of apparatus heretofore available the same proved unreliable in use either because of uncertainty as to continuous or uniform delivery, or because of clogging or corrosion, or for other reasons.

It is the principal object of the present invention to provide a mixing sprayer which is simple in construction, reliable in its operation and which can be made at moderate cost.

It is a further object of the present invention to provide a mixing sprayer for detachable connection to a conventional garden hose and for utilizing the water delivery by the hose for diffusing other materials distributed in and with the water in spray or fog form.

It is a further object of the present invention to provide a mixing sprayer in which the mixing and delivery portions of the same are remote from the place of connection of the water supply used therewith.

It is a further object of the present invention to provide a mixing sprayer having a water supply connection and in which the feed back of material to be mixed with the water to the water supply is avoided.

It is a further object of the invention to provide a simple but effective mixing and projecting structure for a plurality of liquids, one of which is the liquid to be dispensed in limited quantities and the other of which is water used as a carrier, the projection being effected either as a very finely divided spray or fog or as a jet spray as desired.

Other objects and advantageous features of the invention will be apparent from the description and claims.

The nature and characteristic features of the invention will be more readily understood from the following description, taken in connection with the accompanying drawings forming part thereof, in which:

Figure 1 is a side view, partly in elevation and partly in vertical section, of a mixing sprayer in accordance with the invention;

Fig. 2 is a fragmentary sectional view, enlarged, taken approximately on the line 2—2 of Fig. 1;

Fig. 3 is an elevational view of the diffusing screen employed at the discharge end;

Fig. 4 is a transverse sectional view taken approximately on the line 4—4 of Fig. 2;

Fig. 5 is a transverse sectional view taken approximately on the line 5—5 of Fig. 2; and Fig. 6 is an enlarged fragmentary vertical sectional view of the manual control valve for controlling the delivery of water from the water supply hose.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, in which a preferred embodiment of the invention is illustrated, a flexible hose 10 is shown, which can be a conventional garden hose, connected to a suitable supply of water under pressure (not shown). The hose 10 can have the customary threaded external end fitting 11 thereon.

The mixing sprayer in accordance with the invention preferably includes a main receptacle carrying body 15 having a lower enlargement 16 with an interiorly threaded portion 17 for the reception of the threaded neck 18 of a container 19 for the material to be dispensed. The container 19 can be of any desired material which is resistant to the liquids to be placed therein for dispensing and is preferably of molded resilient synthetic plastic material so as to be free from likelihood of breakage.

A boss 20 is provided on the body 15 interiorly of the threaded portion 17 and a vent opening 14 connecting the interior of the container 19 through the body 15 is provided. The opening 14 permits air to enter the container 19 so that the contents thereof can be withdrawn by an induced action or suction, as hereinafter explained.

The body 15 has an integral inclined handle extension 21 of the pistol grip type downwardly and rearwardly inclined with respect thereto. The body 15 has a longitudinal bore 22 with an internally threaded end 23 for the engagement of the rear end of an outer extension tube 24.

The bore 22 has a bore 25 in intersecting relation thereto and within the boss 20.

A dispensing tube 26, extending into the container 19, extends through the bore 25, a gland nut 27 and packing ring 28 preventing fluid leakage at this location. The tube 26 extends forwardly in the bore 22 and within the outer extension tube 24, in spaced relation thereto, to provide a passage 29 for water.

The bore 22 has a reduced bore 30 aligned therewith in which an orifice plug 31 is provided. The orifice plug 31 has an orifice or restriction 32 therein for controlling the flow of water delivered to the bore 22. The bore 30 has a bore 33 of larger diameter communicating therewith, the junction of the bore 33 and the bore 30 providing a valve seat 35.

Within the handle extension 21, a fluid delivery bore 36 is provided communicating with the bore 33.

The handle extension 21 is provided with a fitting 37 for the reception of a coupling nut 38 engageable with the threaded exterior end fitting 11 of the hose 10.

At the rear end of the bore 33, a plug 39 is provided in threaded engagement therein with a sealing ring 40 interposed between the plug 39 and the main body 15 for preventing fluid leakage.

A valve stem 41 is provided extending through the plug 39. The valve stem 41, at the inner end thereof, has an enlarged head 42 with a sealing ring 43 carried thereon for engagement with the valve seat 35.

A compression coil spring 44 is provided on the valve stem 41 and in engagement at one end with the head 42. The spring 44 is in engagement at the other end with a washer 45 which is in engagement with a sealing washer 46 bearing on the interior of the plug 39 for preventing fluid leakage around the valve stem 41.

At the rear end of the valve stem 41, a bifurcated valve control lever 47 is provided, pivotally connected to the valve stem 41 by a pivot pin 48, and has a cam face 49 for engagement with the outer face of the plug 39. The control lever 47 has an arm portion 50 for actuation by the thumb of the user when the handle extension 21 is gripped by the user. Upon swinging of the arm portion 50 vertically downwardly, the cam face 49 is positioned to retain the valve head 42 in open position. Intermediate positions of the valve head 42 can also be effected by manually controlled positioning of the arm portion 50.

At the front end of the outer extension tube 24 a nut 51 is provided having a hexagonal rear portion 52 for gripping and a forward portion 53 for interior threaded engagement with a sprayer nozzle body 54.

The sprayer nozzle body 54 has an internally threaded rear bore 55 in a rear end section 56 with which the forward portion 53 of the nut 51 is in engagement, a packing ring 57 preventing fluid leakage at this location.

The bore 55 has an end shoulder 58 from which a bore 59 coaxial therewith extends to a bore 60 which connects to a frusto-conical aerating chamber 61 in the interior of the nozzle body 54.

At the front end of the nozzle body 54 a threaded portion 65 is provided for the reception of a removable screen retainer 66 having an inwardly extending flange 67 for engagement with a diffusion screen 68. The diffusion screen 68 may be of any desired foraminous material of adequate strength, such as woven plastic, woven wire, or the like, but is preferably a material resistant to corrosion by the materials coming in contact therewith. A washer 69 having an opening 70 therethrough is held by the retainer 66 at the inner face of the screen 68.

The screen retainer 66, screen 67 and washer 69 can be removed if a jet spray is desired and as hereinafter explained.

The nut 51 has an interior bore 71 of substantially the same diameter as the bore 59 and in longitudinal axial alignment therewith.

Within the interior of the bore 71, a rear plug 72 is provided having a rearward tubular extension 73 for the reception of the front end of the dispensing tube 26. The plug 72 has a rim 74 against which a packing ring 75, preferably an O-ring, is in engagement for preventing fluid leakage at this location. Forwardly of the rim 74 an annular groove 76 is provided for connection of a passage 77 which connects the interior of the tubular extension 73 to the annular space at the groove 76.

The plug 72 at the forward end has an opening 78 to which ports 79 extend for connecting the passage 29 thereto.

A front plug 80 is provided extending into the bore 59 and having a packing ring 81, such as an O-ring, on the periphery thereof and for engagement with the shoulder 58 for preventing fluid leakage at this location. The plug 80 has a central discharge bore 82 therein with a rear annular groove 83 for the reception of a chamber plug 84 held therein with a press fit.

The chamber plug 84 has a beveled rear end portion 85 secured within the opening 78, an interposed packing ring 86, such as an O-ring, preventing fluid leakage at this location. The plug 84 has a central longitudinal axial port 87 with an annular groove 88 around the front end thereof, the rear end thereof communicating with the interior of the opening 78.

The plug 84 has a diagonally extending passage 89 extending from the exterior thereof to the groove 88. It will be noted that the groove 88 provides an annular chamber to which the passage 89 extends for delivery of material to be dispensed, to which the port 87 extends for water delivery, and from which the discharge bore 82 extends.

The mode of operation will now be pointed out.

Water under pressure is supplied through the hose 10 and through the bore 36 to the bore 33.

The material to be dispensed, with the desired dilution and for regulated dispensing, is placed within the container 19 which is secured in position with its neck 18 in engagement within the threaded portion 17 and with the tube 26 extending into the material to be dispensed.

If, now, it is desired to deliver the material from the container 19, the handle extension 21 is gripped in the hand and the arm portion 50 is moved by the thumb of the user to the desired extent for limited delivery or for maximum permissible delivery.

Movement of the arm portion 50 controls the position of the valve head 42 with respect to the valve seat 35 for determining the flow of water to and through the restriction or orifice 32 in the orifice plug 31. It has been ascertained that with variations in water pressure supplied by the hose 10 in the range from about 30 to 80 p.s.i. a substantially uniform rate of delivery of the material to be dispensed can be maintained by the use of the restriction or orifice 32.

The water under pressure delivered through the restriction or orifice 32 to the bore 22 and around the exterior of the tube 26 and in the space 29 passes through the ports 79 to the opening 78 and then through the port 87 to the central part of the space which is surrounded by the annular groove 88 where it entrains or draws liquid by suction from that space. The turbulent action aids in the mixing which continues as the water and entrained liquid passes through the bore 82 and to the bore 60.

The liquid at the annular space 88 for mixing with the water is drawn to that location through the passage 89, the space at the annular groove 76, the passageway 77, and the tube 26 from the container 19.

The mixed liquids enter the aerating chamber 61 and the subsequent discharge is determined by the presence or absence of the screen 68.

If a jet spray is desired the screen 68 and washer 69 are removed and the mixed liquid is discharged in jet form from the open end of the aerating chamber 61.

If a cone shaped fog spray is desired, with the washer 69 and screen 68 in place, the mixed liquid from the bore 60 initially disperses in part in the aerating chamber 61.

By the turbulence in the chamber 61 as well as impingement of the stream on a restricted area of the screen 68, as determined by the opening 70 in the washer 69, the fog spray of cone shape is delivered beyond the screen 68.

It will be noted that by reason of the location of the initial mixing of the material to be dispensed with the water between the port 87 and the bore 82, an appreciable length of outer extension tube 24 and inner tube 26 can be employed. The mixing and dispersion are at locations distant from the hand extension 21. The discharged material is thus remote from the handling and controlling parts so that the likelihood of spray materials dripping on or being deposited on the user is greatly reduced. At the same time a discharge of effective character is obtained with variation of the quantity and type of spray available to the user.

The entire structure is light in weight, easy to fill, easy to use, and clean to handle and adjust. At the same time a regulated rate of discharge is obtained, so as to maintain the desired concentration of sprayed material.

I claim:

1. A sprayer nozzle comprising a nozzle body having a first longitudinal bore and a discharge chamber communicating with said bore, a closure member detachably connected to said nozzle body, said closure member having a pressurized water supply connection and a connection to a source of liquid to be mixed with the water extending therethrough, said closure member having a second longitudinal bore aligned with said first bore, a first plug member detachably seated in said first bore and in sealed relation thereto and having a central discharge bore in communication with said discharge chamber, a chamber plug detachably seated in said first plug member and having a central longitudinal port, said plug member and said chamber plug having spaced interior portions providing an annular space surrounding said central port and in communication therewith, said chamber plug having a passage connected to said annular space and to a space around said chamber plug, a second plug member detachably seated in said second longitudinal bore and in sealed relation thereto and with which said chamber plug is in sealed engagement, said second plug member having a passageway therein connected to said water supply connection and to said central longitudinal port and another passageway therein connected to said connection to said source of liquid and to said space around said chamber plug.

2. A sprayer nozzle as defined in claim 1 in which a foraminous closure having a central opening is provided at the front end of said discharge chamber.

3. A sprayer nozzle as defined in claim 1 in which said discharge chamber at the front end thereof has a removable ring, a foraminous sheet at said front held in position by said ring, and a restrictive member interiorly of said sheet with a central opening of smaller diameter than the discharge end of said discharge chamber.

4. A sprayer nozzle as defined in claim 1 in which a body portion is provided having a first pressurized water delivery connection extending thereto and a second pressurized water delivery connection extending therefrom, said body portion has a manually operable valve member carried thereby for controlling the delivery of water from said first delivery connection to said second delivery connection, said body portion has a liquid receptacle carried thereby for the liquid to be mixed with the water, a liquid connection from said receptacle, and said body portion has a fixed restriction interposed in said second water delivery connection contiguous to said valve member.

References Cited in the file of this patent

UNITED STATES PATENTS

| | | |
|---|---|---|
| 1,395,537 | Walker | Nov. 1, 1921 |
| 2,149,526 | Johnson | Mar. 7, 1937 |
| 2,302,799 | Peterson | Nov. 24, 1942 |
| 2,388,445 | Stewart | Nov. 6, 1945 |
| 2,612,403 | Burch | Sept. 30, 1952 |